US012587034B2

(12) United States Patent
Jeon

(10) Patent No.: US 12,587,034 B2
(45) Date of Patent: Mar. 24, 2026

(54) SYSTEMS, DEVICES, AND METHODS FOR WIRELESSLY TRANSMITTING POWER

(71) Applicant: Jong Whee Jeon, Brighton, MA (US)

(72) Inventor: Jong Whee Jeon, Brighton, MA (US)

( * ) Notice: Subject to any disclaimer, the term of this patent is extended or adjusted under 35 U.S.C. 154(b) by 0 days.

(21) Appl. No.: 18/778,894

(22) Filed: Jul. 19, 2024

(65) Prior Publication Data

US 2025/0211024 A1    Jun. 26, 2025

Related U.S. Application Data

(60) Provisional application No. 63/613,157, filed on Dec. 21, 2023.

(51) Int. Cl.
*H02J 50/00* (2016.01)
*H02J 50/40* (2016.01)
*H02J 50/80* (2016.01)
*H02J 50/10* (2016.01)
*H02J 50/70* (2016.01)

(52) U.S. Cl.
CPC .......... *H02J 50/001* (2020.01); *H02J 50/402* (2020.01); *H02J 50/80* (2016.02); *H02J 50/10* (2016.02); *H02J 50/70* (2016.02)

(58) Field of Classification Search
CPC ........ H02J 50/001; H02J 50/80; H02J 50/402; H02J 50/10; H02J 50/70
USPC ......................................................... 307/104
See application file for complete search history.

(56) References Cited

U.S. PATENT DOCUMENTS

| | | | |
|---|---|---|---|
| 4,512,431 A | 4/1985 | Bloomfield | |
| 7,793,121 B2 * | 9/2010 | Lawther .................. | H02J 50/80 |
| | | | 713/300 |
| 8,800,738 B2 * | 8/2014 | Urano ...................... | H04B 5/79 |
| | | | 307/104 |
| 9,124,308 B2 * | 9/2015 | Metcalf ................. | H02J 50/005 |
| 9,791,297 B2 * | 10/2017 | Lehtiniemi ............. | H02J 50/90 |
| 10,333,333 B2 | 6/2019 | Ritter et al. | |
| 11,191,049 B1 | 11/2021 | Chandrasekher et al. | |
| 11,336,129 B2 | 5/2022 | Goodchild et al. | |
| 11,569,685 B2 * | 1/2023 | Partovi ................... | H02J 50/05 |
| 11,605,987 B2 | 3/2023 | Goodchild | |
| 11,728,683 B2 | 8/2023 | Goodchild et al. | |
| 11,837,883 B2 | 12/2023 | Goodchild et al. | |
| 12,095,283 B2 | 9/2024 | Goodchild et al. | |

(Continued)

FOREIGN PATENT DOCUMENTS

| WO | 2021/141910 A1 | 7/2021 |
|---|---|---|
| WO | 2023/022994 A1 | 2/2023 |

OTHER PUBLICATIONS

International Search Report for family International Application No. PCT/US2024/061584, mailed Mar. 13, 2025.

(Continued)

*Primary Examiner* — Alfonso Perez Borroto
(74) *Attorney, Agent, or Firm* — United One Law Group LLC; Kongsik Kim; Jhongwoo Peck

(57) ABSTRACT

Systems, devices, and methods for wirelessly transmitting power are provided. Devices in accordance with embodiments of the present invention include a transmitter layer, a sensor layer disposed on the transmitter layer, and a cover disposed on the sensor layer. With the systems, devices, and methods, power can be wirelessly transmitted effectively and efficiently.

17 Claims, 17 Drawing Sheets

(56) References Cited

U.S. PATENT DOCUMENTS

| | | | | |
|---|---|---|---|---|
| 2010/0219697 A1* | 9/2010 | Azancot | ................. | H02J 50/80 |
| | | | | 307/104 |
| 2012/0001592 A1* | 1/2012 | Fukaya | ................. | H02J 50/40 |
| | | | | 320/108 |
| 2012/0313577 A1* | 12/2012 | Moes | ..................... | H02J 50/90 |
| | | | | 320/108 |
| 2017/0288460 A1 | 10/2017 | Yao et al. | | |
| 2018/0090955 A1* | 3/2018 | Graham | ................. | H02J 50/60 |
| 2019/0190324 A1* | 6/2019 | Bossetti | ................... | G01D 5/16 |
| 2020/0136436 A1 | 4/2020 | Goodchild et al. | | |
| 2020/0200937 A1* | 6/2020 | Widmer | ................. | H02J 50/12 |
| 2021/0101680 A1* | 4/2021 | Naderi | ................. | H02J 50/402 |
| 2021/0124078 A1* | 4/2021 | Widmer | .............. | H05B 1/0288 |
| 2021/0249876 A1 | 8/2021 | Slatnick et al. | | |
| 2023/0044989 A1 | 2/2023 | Goodchild et al. | | |
| 2024/0275642 A1 | 8/2024 | Jiang et al. | | |
| 2025/0023394 A1 | 1/2025 | Russell et al. | | |

OTHER PUBLICATIONS

Written Opinion of the ISA for family International Application No. PCT/US2024/061584, mailed Mar. 13, 2025.

Teschler, "Basics of wireless power transmission design," Power Electronic Tips, Apr. 18, 2019 (https://www.powerelectronictips.com/basics-of-wireless-power-transmission-design/)—retrieved on Oct. 14, 2025.

* cited by examiner 2023-03-23⊞5:47:26

SYSTEMS, DEVICES, AND METHODS FOR WIRELESSLY TRANSMITTING POWER

CROSS-REFERENCE TO RELATED APPLICATIONS

This application claims priority to U.S. Application No. 63/613,157 filed on Dec. 21, 2023, which is incorporated herein by reference.

TECHNICAL FIELD

The present invention relates to systems, devices, and methods for wirelessly transmitting power cost-effectively and conveniently.

BACKGROUND

Power can be wirelessly transferred from a power transmitting device (also referred to in the art as a wireless charger or a charging station) to a power receiving device (also referred to in the art as a portable device). For example, a portable device (e.g., portable phones, portable media players, electronic watches, tablets, laptops, portable medical devices, portable power tools, portable home appliances, portable batteries, electric vehicles, robots, drones, and the like) can be charged by magnetic induction between the transmitter coil(s) of a wireless charger and the receiver coil(s) of the portable device.

Typically, a power transmitting device detects a power receiving device by pinging. More specifically, the power transmitting device continuously or periodically sends an analog ping signal over the wireless interface towards the power receiving device. Once the power receiving device receives the analog ping signal, it responds to the power transmitting device over the wireless interface. When the power receiving device responds, the power transmitting device recognizes that the power receiving device is present and starts to transmit power to the power receiving device. Power loss, however, occurs during the process of detecting power receiving devices.

There still exists a need for new systems, devices, and methods for wirelessly transmitting power cost-effectively and conveniently.

SUMMARY

An aspect of the present invention provides a power transmitter device comprising a cover layer, a sensor layer, and a transmitter layer.

Another aspect of the present invention provides a system for wirelessly transmitting power, which comprises a power receiving device and the above-described power transmitting device for wirelessly transmitting power to the power receiving device.

A still another aspect of the present invention provides a method for wirelessly charging one or more power receiving devices. The method comprises the steps of: (a) allowing a user or users to place one or more power receiving devices on a power transmitting device; (b) allowing sensors of the power transmitting device to convert mechanical pressure generated by the power receiving device or devices to an electrical signal or signals; (d) scanning corresponding locations of the sensors by sending analog ping signals; (e) determining whether the power transmitting device receives a response or responses from the power receiving device or devices in a predetermined time period; and (f) transmitting power to the power receiving device or devices in response to the determination that the power transmitting device receives a response or responses from the power receiving device or devices in the predetermined time period.

The other aspects and features of the above-described embodiments and other embodiments will be described in more detail below.

DETAILED DESCRIPTION

1. Systems and Devices

Figure 1A:
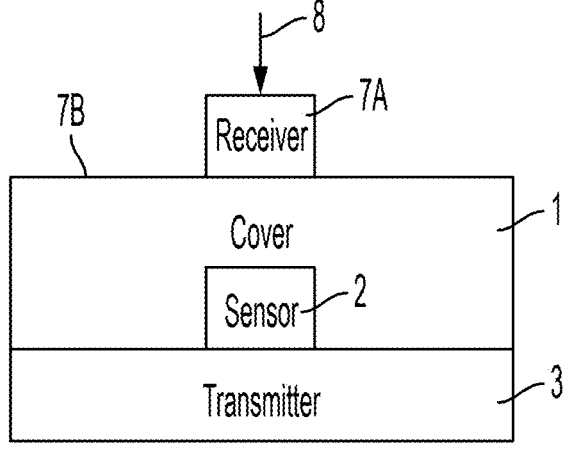
FIGS. 1A and 1B show the structural relationship between a wireless power receiving device and a wireless power transmitting device in accordance with embodiments of the present invention.
Figure 1B:
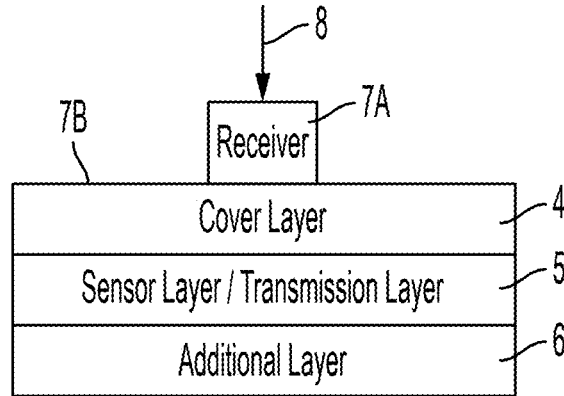

Referring to FIG. 1A, a wireless power transmitting system in accordance with an embodiment of the present invention includes a power receiving device (or a receiver) 7A and a power transmitting device 7B. The power transmitting device 7B comprises one or more covers 1, one or more sensors 2, and one or more transmitters 3. The cover(s) 1, the sensor(s) 2, and the transmitter(s) 3 can be provided in one or more layers. For example, the cover(s) 1, the sensor(s) 2, and the transmitter(s) 3 can be provided in three separate layers (i.e., a cover layer, a sensor later, and a transmitter layer). Also, for example, as illustrated in FIG. 1B, the sensor(s) 2 and the transmitter(s) 3 can be integrated in a single layer 5, and the cover(s) 1 can be provided in a separate layer 4. In addition, for example, the cover(s) 1, the sensor(s) 2, and the transmitter(s) 3 can be integrated in a single layer. One or more additional layers 6 can be provided at a desirable position to provide support and/or increase performance, and/or provide other functions. For example, one or more additional layers 6 can be provided between a sensor layer and a transmitter layer, and the additional layer or layers 6 can comprise, but not limited to, a printed circuit board, a magnetic sheet, an insulator, a rubber, a plastic plate, or the like. The size, the shape, and/or the order of the cover layer, the sensor layer, the transmitter layer, and the additional layer can be adjusted depending on design needs and/or requirements. For example, the sensor layer can be positioned below the transmitter layer.

The transmitter layer may, suitably, include electric components required for wireless power transfer and transmitter control, such as transmitter coils, DC/AC and AC/DC converters, microcontrollers and microprocessors and other necessary electrical components. The transmitter layer may, suitably, comprise a magic shield that enhances the magnetic coupling between the power transmitting device and the power receiver device and that reduces electromagnetic radiation of the power transmitting device.

Figure 3A:
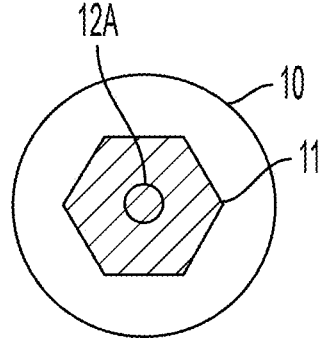
FIGS. 3A, 3B, and 3C show the structural relationship among the tiles, the sensors, and the transmitter coils of a wireless power transmitting device in accordance with embodiments of the present invention.
Figure 3B:
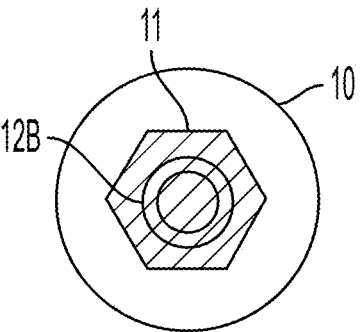
Figure 3C:
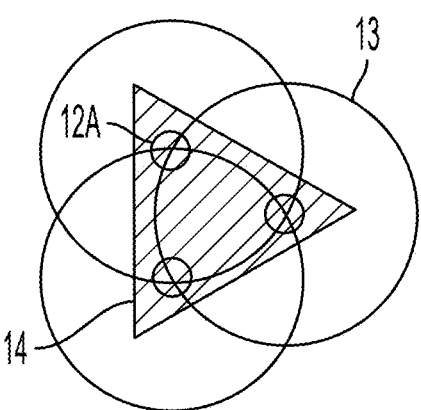

The sensor layer may, suitably, function to convert a physical parameter (e.g., mechanical stress) into an electrical charge. Any type of sensor can be used as long as the sensor can convert a physical parameter into an electrical charge. Examples of the sensor may include, but not limited to, a rod-shaped piezoelectric sensor 12A and a disc-shaped piezoelectric sensor 12B, as illustrated in FIG. 3.

Figure 2:
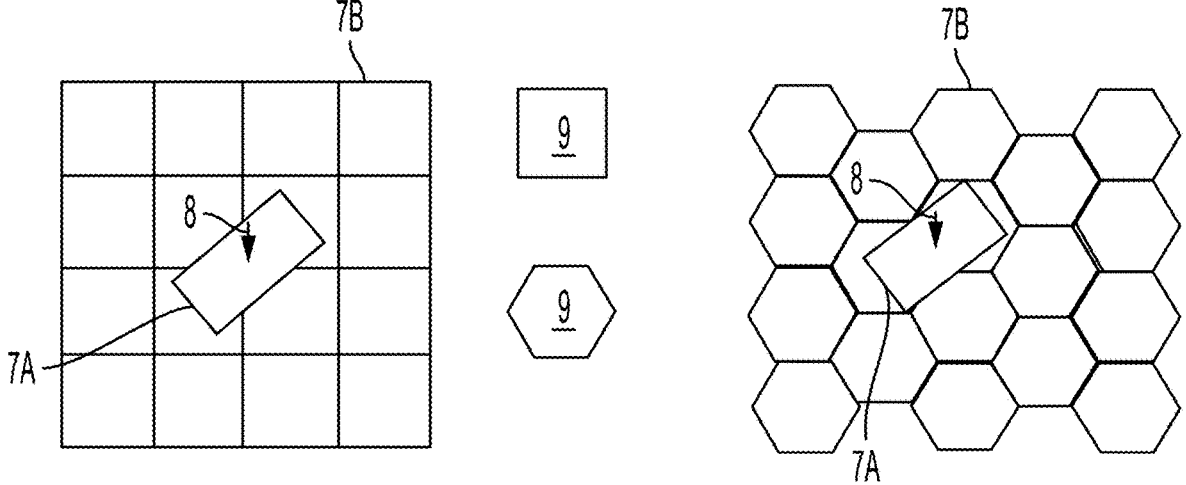
FIG. 2 shows examples of the cover layer of a wireless power transmitting device in accordance with embodiments of the present invention.
Figure 4A:
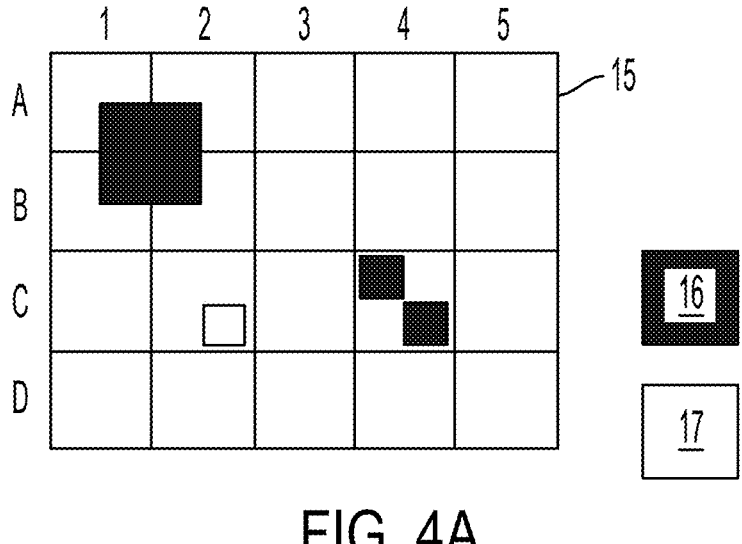
FIG. 4A illustrates an example of the cover layer of a wireless power transmitting device in accordance with an embodiment of the present invention, in which the squares indicate tiles.
Figure 4B:
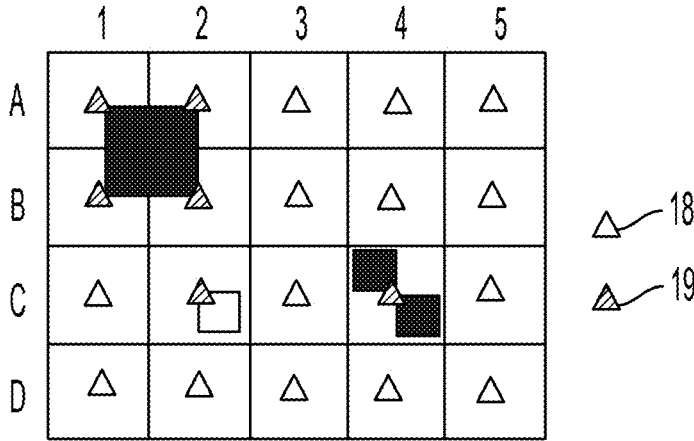
FIG. 4B illustrates an example of the cover layer and the sensor layer of the wireless power transmitting device, in which the squares indicate tiles, the squares shaded in gray indicate the tiles on which foreign objects are placed, and the triangles indicate sensors.
Figure 4C:
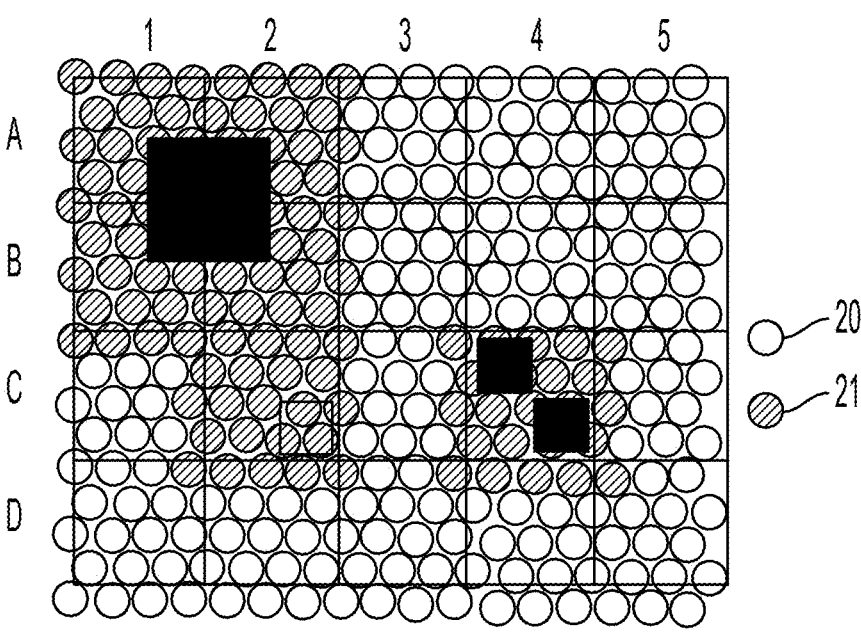
FIG. 4C illustrates an example of the cover layer and the transmitter coils of the wireless power transmitting device, in which circles indicate transmitter coils and the circles shaded in gray indicate the transmitter coils that correspond to the tiles on which objects are placed.
Figure 4D:
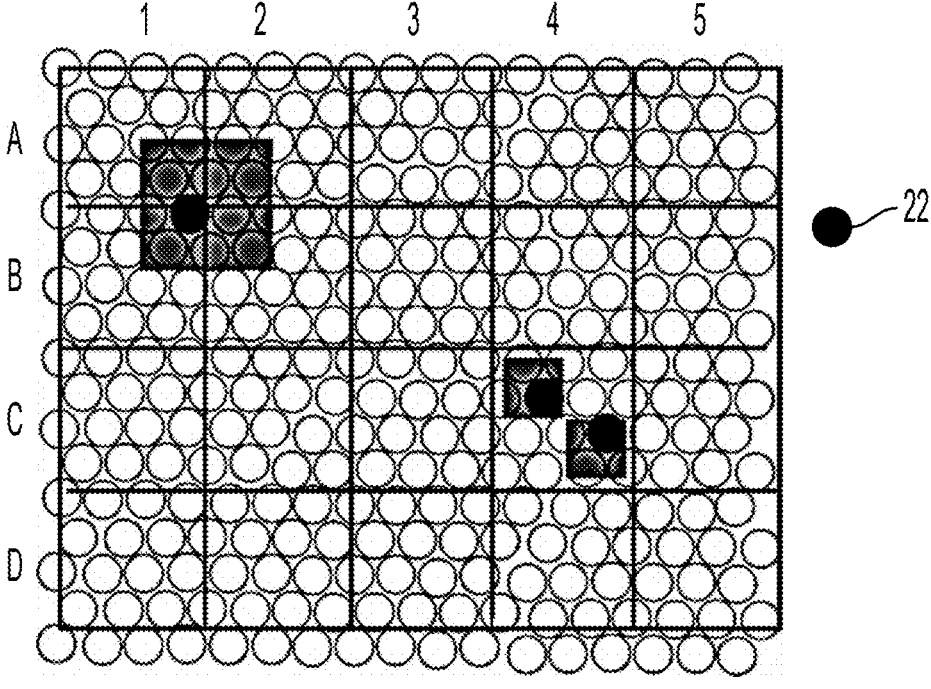
FIG. 4D illustrates an example of the cover layer and the transmitter coils of the wireless power transmitting device, in which circles indicate transmitter coils and the circles shaded in gray indicate the transmitter coils that has received a response from a receiver(s).

The cover layer may, suitably, function to protect sensor(s) 2 from excessive stress. Optional supports may be provided to increase the stability of the cover layer and/or enhance the mechanical stress generated by foreign objects. In addition, the cover layer may, suitably, function as an index that the power transmitting device can use to locate the power receiving device. In more detail, as illustrated in FIG. 2, FIG. 3, and FIG. 4A, the cover layer may be sectionalized with a plurality of tiles 9, 11, 14, 15 and each of the tiles 9, 11, 14, 15 may be assigned a unique ID (e.g., A1, A2, A3, . . . , D3, D4, and D5). The unique IDs can be saved in a suitable way (e.g., in a vector or a matrix). The thus-obtained tile index can be used by the power transmitting device to locate the power receiving device. The tile index shown above is only for the purpose of illustration, and it can be adjusted depending on design needs and/or requirements.

In an identical or similar manner, the sensors 2, 18 and the transmitter coils 13, 20 can be indexed. The tile index, the sensor index, and the transmitter coil index may, suitably, be designed to cover the entire charging surface. The size, the shape, and the number of the indexes can be adjusted depending on design needs and/or requirements.

In some embodiments, the tiles 9 may be designed to fit together without gaps. In some other embodiments, at least some of the tiles 9 may be designed to be overlapped to increase the detection capabilities of the sensor(s) 2. The size, the material, and the shape of the tiles 9 can be adjusted depending on design needs and/or requirements. For example, as illustrated in FIG. 2 and FIG. 3, the tiles 9 may be triangular, rectangular, or hexagonal.

As illustrated in FIG. 3, FIG. 4A, FIG. 4B, FIG. 4C, FIG. 4D, one or more tiles may, suitably, be designed to correspond to one or more sensors and/or correspond to one or more transmitter coils. For example, in some embodiments, a single tile 11 may be designed to be dedicated to a single power transmitter coil 10, and a single sensor 12A, 12B. In some other embodiments, a single tile 14, 15 may be designed to be shared by multiple power transmitter coils 13, 20 and by multiple sensors 12A, 12B, 18. Although not shown in the figures, two or more tiles can be designed to be dedicated to one or more sensors and or to one or more transmitter coils or to be shared by two or more sensors and or two or more transmitter coils. However, the configuration of the tile(s), the sensor(s), and the transmitter coil(s) should not be limited to the ones illustrated above, and it can be modified in many other ways depending on design needs and/or requirements.

When one or more power receiving devices (or receivers) 16 and objects 17 are placed on the surface of the power transmitting device in accordance with an embodiment of the present invention, the receiver or receivers and/or objects can be positioned in one or more tiles. Mechanical stress 8 is generated by the receiver(s) and objects and is applied to one or more tiles 9,15 of the cover layer of the power transmitting device. Then one or more tiles 9, 15 will experience a change in mechanical pressure and transfer the mechanical pressure to the sensor(s) 2, 18. For example, as illustrated in FIG. 4A, when one receiver 16 is placed on four tiles A1, A2, B1, and B2, two receivers 16 are placed on a single tile C4, one foreign object 17 is placed on tile C2, the tiles A1, A2, B1, B2, C2 and C4 will transfer the mechanical energy generated by the three receivers 16 and the foreign object 17 to the sensor(s) 2, 18. The mechanical pressure will be translated to signals by the sensor(s) 19 as electric potentials. The signals will be processed to filter out noise. Then the processed signals can be used to signal the microcontroller and/or the microprocessor 44 to start pinging process 21 at or near the location where the mechanical stress is applied. If no response from the object was detected, the object is classified as foreign object 17. If a response from the object was detected, the object is classified as receiver 16 and the transmitter(s) 22 or the transmitter coil(s) 22 that received the response will be used to transmit power to the receiver(s) in an optimal manner.

Figures 5A, 5B:
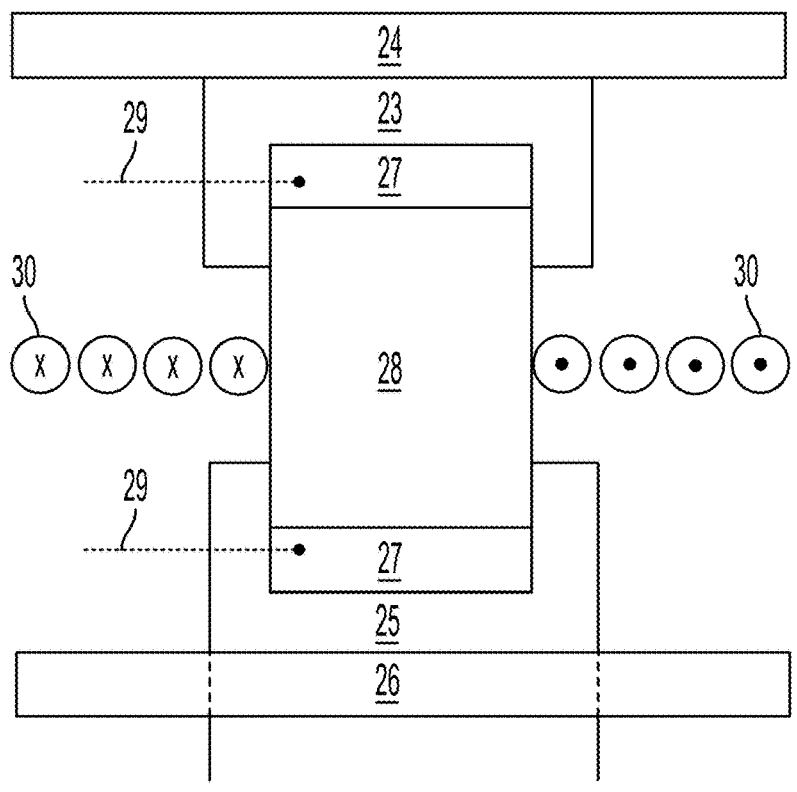
FIGS. 5A, 5B, 6A, and 6B are sectional views of wireless power transmitting devices in accordance with embodiments of the present invention.

FIG. 5A is a sectional view of a wireless power transmitting device in accordance with an embodiment of the present invention. An upper well 23 is provided under a tile 24, and a lower well 25 is provided through a magnetic shield 26. Metallic elements 27 are electrically connected to both ends of a rod-shape piezoelectric sensor 28. Wires 29 are connected with the metallic elements 27, through the upper and lower wells, respectively. Power transmitter coils 30 are provided to surround the sensor 28. FIG. 5B is a sectional view of a wireless power transmitting device in accordance with a modified embodiment of the present invention. In this embodiment, optional supports 31 are provided to protect the sensors and enhance the signal quality of the sensors. Preferably, in selecting optional supports, the permeability of electromagnetism should be considered to allow proper functions of the power transmitting device. FIG. 5B is presented only for illustration, and the optional supports can be installed in any suitable place depending on design needs and/or requirements.

Figure 6A:
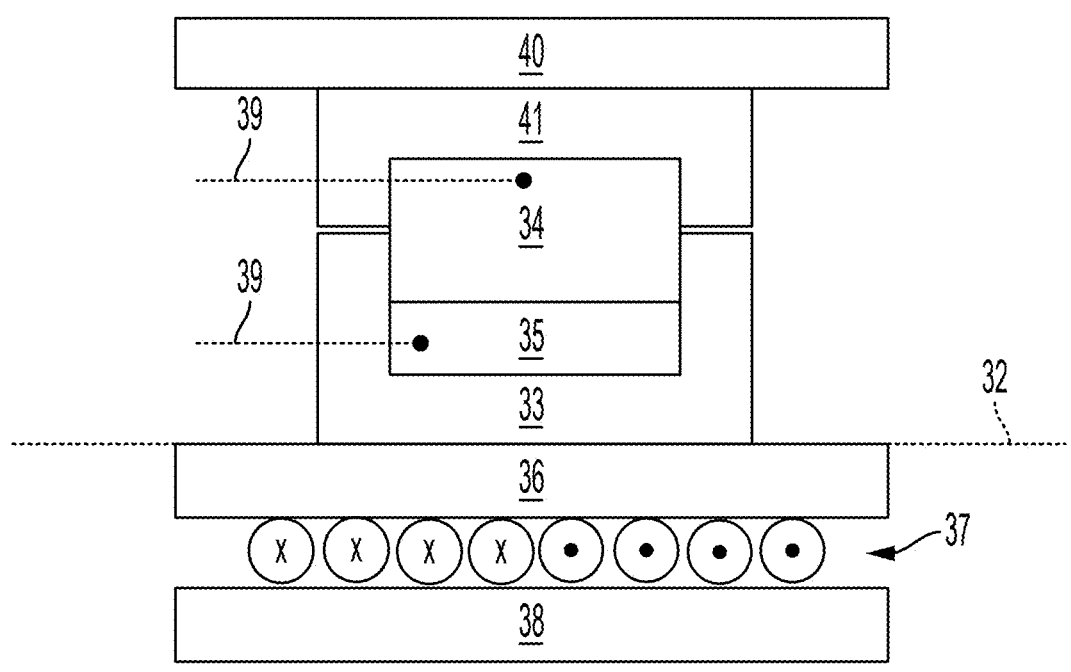
Figure 6B:
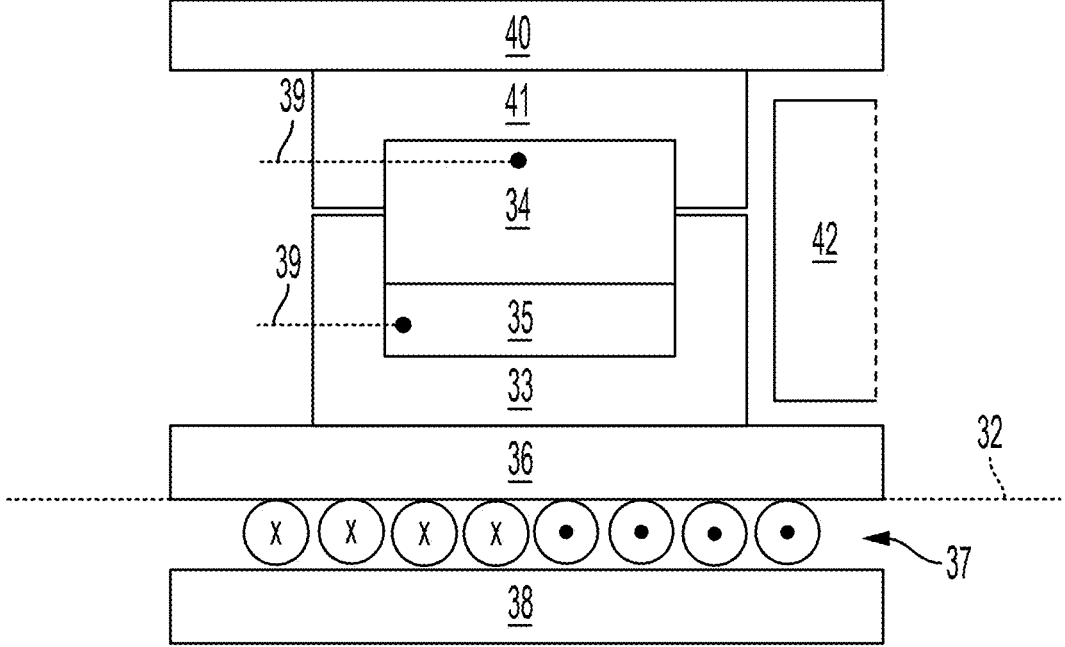

FIG. 6A is a sectional view of a wireless power transmitting device in accordance with another embodiment of the present invention. An upper well 41 is provided under a cover layer 40. Power transmitter coils 37 are provided on a transmitter layer 32. A lower well 33 is provided on or over the optional support 36. An optional support 36 may be provided between the lower well 33 and the power transmitter coils 37 for more stability. A disc-shaped piezoelectric sensor 34 is held in place by the upper well 41 and the lower well 33. A metal plate 35 is electrically connected to the sensor 34. Wires 39 are connected with the sensor 34 and the metal plate 35. A magnetic shield 38 is provided underneath the transmitter coils 37. FIG. 6B is a sectional view of a wireless power transmitting device in accordance with a modified embodiment of the present invention. In this embodiment, additional supports 42 are provided to enhance the signal quality of the sensors. In selecting the material of these additional supports, the electromagnetic permeability should be considered in order for the power transmitting device to function properly. FIG. 6B is presented only for illustration, and the optional supports can be installed in any suitable place depending on design needs and/or requirements.

When an object comes in contact with the surface of the cover layer 24, 40, the weight of the object induces mechanical stress on the piezoelectric sensor 28, 34. The mechanical stress is converted into a signal by the changes in electrical potential across the piezoelectric sensor 28, 34. The signal is then received by the microprocessor and/or the microcontroller through the wires 29, 39, and the signal is then processed by the microprocessor and/or the microcontroller. The transmitter coils will begin to scan the corresponding area with analog ping signals in the general location of the object. If the object is a power receiving device, the power transmitting device will transmit power to the object through magnetic coupling. If the object is not a power receiving device, the transmitter coil will stop the analog pinging process until a next change in potential is detected.

Figure 7:
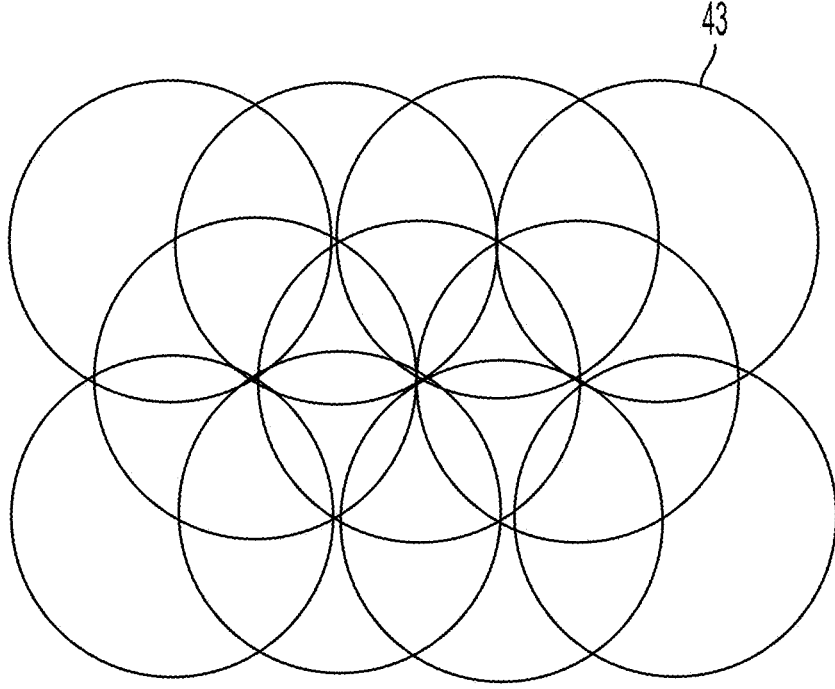
FIG. 7 illustrates the layout of the transmitter coils of a wireless power transmitting device in accordance with an embodiment of the present invention.

FIG. 7 illustrates the layout of the transmitter coils of a wireless power transmitting device in accordance with an embodiment of the present invention, in which power transmitter coil or coils 43 that can cover a given surface area with maximum uniformity are provided. In order to achieve positional freedom of a power receiving device, a single electromagnetic field (EMF) or all EMFs transmitted from power transmitter coil or coils 43 should cover all or substantially all of the surface of the cover layer of the power transmitting device. A single power transmitter coil can be used if the power transmitter coil can produce an EMF to cover the whole surface. Also, multiple power transmitter coils can be used if the power transmitter coils together can produce EMFs to cover the whole surface. As described above, the positions, the shape, and the geometry of the power transmitter coils can be modified to better fit the design needs or requirements. In some embodiments, multiple layers of the coils can be used to achieve such uniform EMF coverage.

Figure 8:
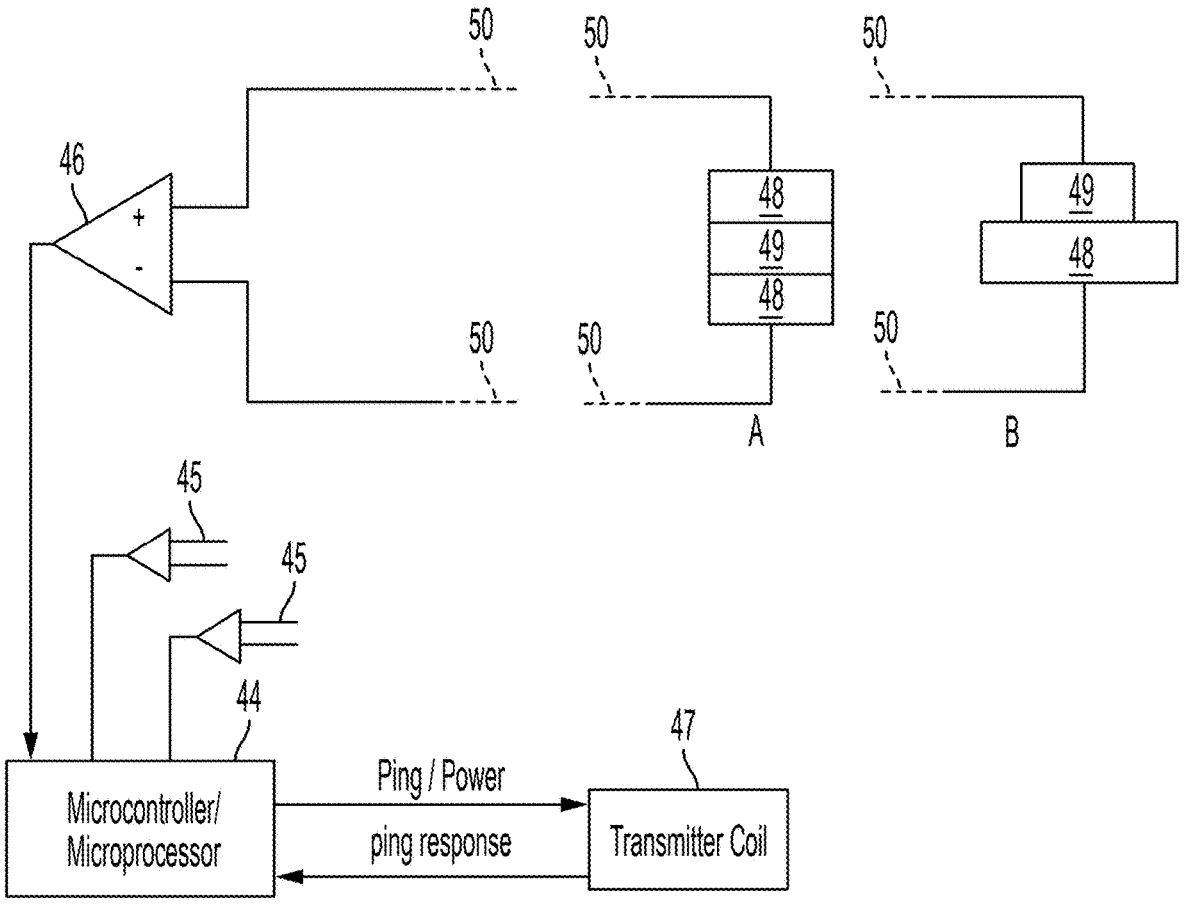
FIG. 8 is a diagram showing a control circuit of a wireless power transmitting device in accordance with an embodiment of the present invention.

FIG. 8 is a diagram showing a control circuit of a wireless power transmitting device in accordance with an embodiment of the present invention. For rod-shaped piezoelectric sensors, the mechanical stress induced on the sensors are converted to electric potential by the piezo material 49 and can be observed as a voltage between the metallic plates 48. For disk-shaped piezoelectric sensors, the mechanical stress is converted to signals by the changes in electric potentials recorded between the piezoelectric material 49 and the metallic plate 48. Through the wires 50, the signal will be processed by, but not limited to, filtering, amplifying, and sampling 46. This process is simplified to an op-amp 45,46. Once the processed signal reaches the microcontroller and/or the microprocessor 44, the microcontroller and/or the microprocessor 44 will determine the transmitter coil 47 that corresponds to the index of the tiles in the cover layer and initiate the pinging of the respective transmitter coils. The microcontroller and/or the microprocessor 44 will wait for the power receiving device to respond to the ping. If the power transmitter coil or coils detect a response from the power receiving device, the microcontroller and/or the microprocessor 44 will initiate power transfer through the transmitter coil that is closest to the receiver. If the power transmitter coil or coils do not detect a response from the power receiving device, the power transmitter coil or coils will power off until the microcontroller and/or the microprocessor 44 receives another signal. In some cases, multiple tiles can send such signals. In such cases, multiple signals can be simultaneously inputted 45 to the microcontroller and/or the microprocessor 44.

Figure 9:
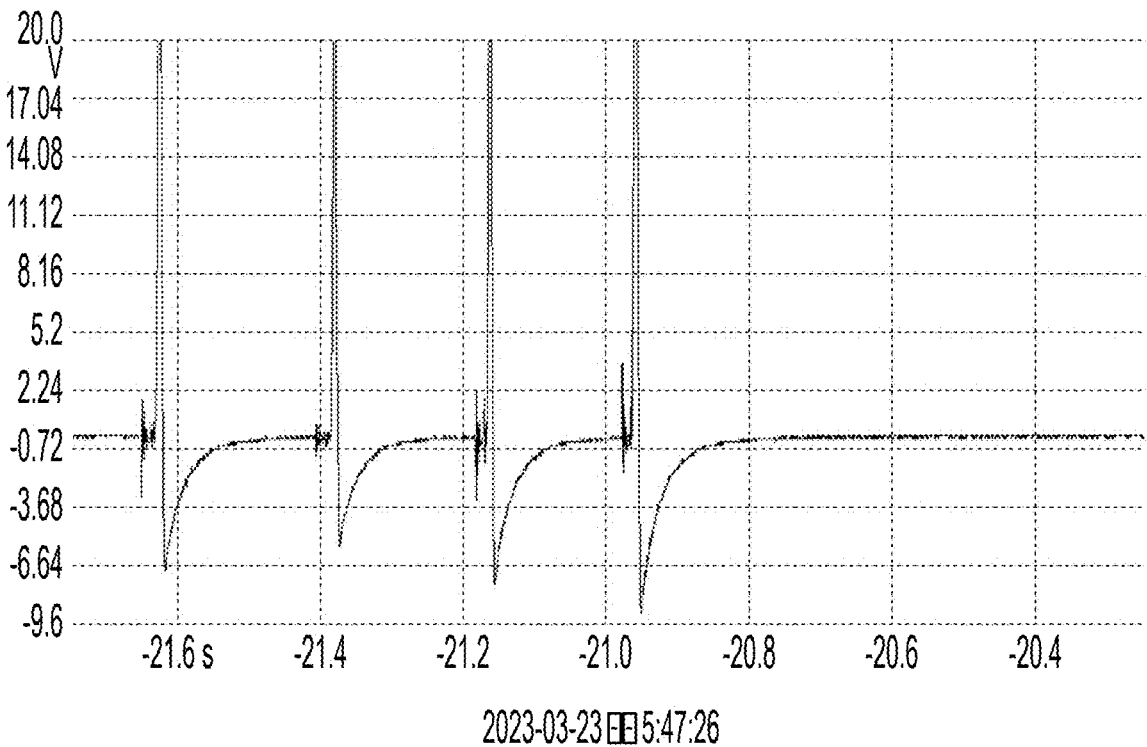
FIG. 9 is an experimental result showing how a disk-shaped piezoelectric sensor responds to external force.
Figure 10A:
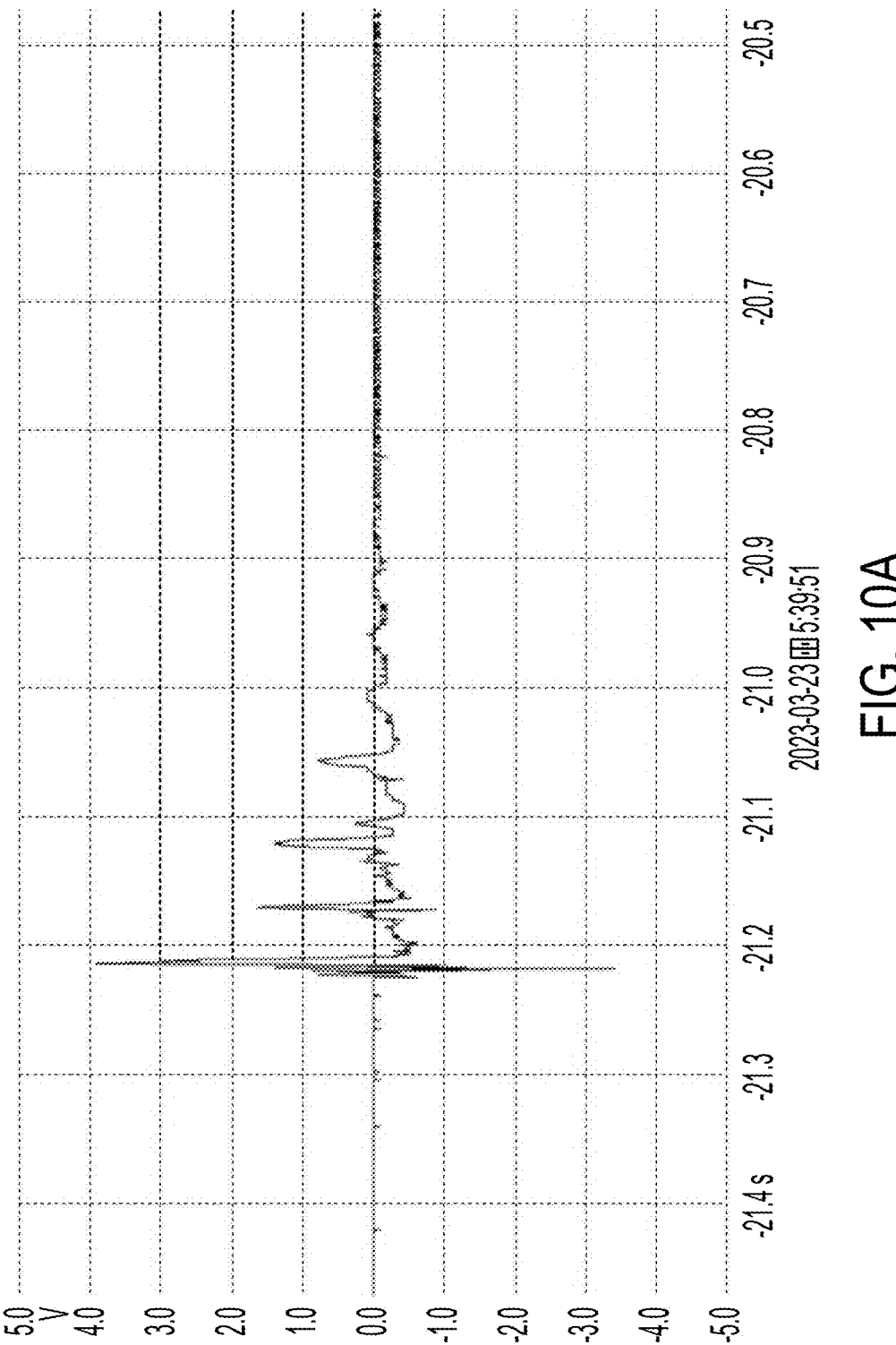
FIG. 10 is an experimental result showing how a disk-shaped piezoelectric material responds to a phone.
Figure 10B:
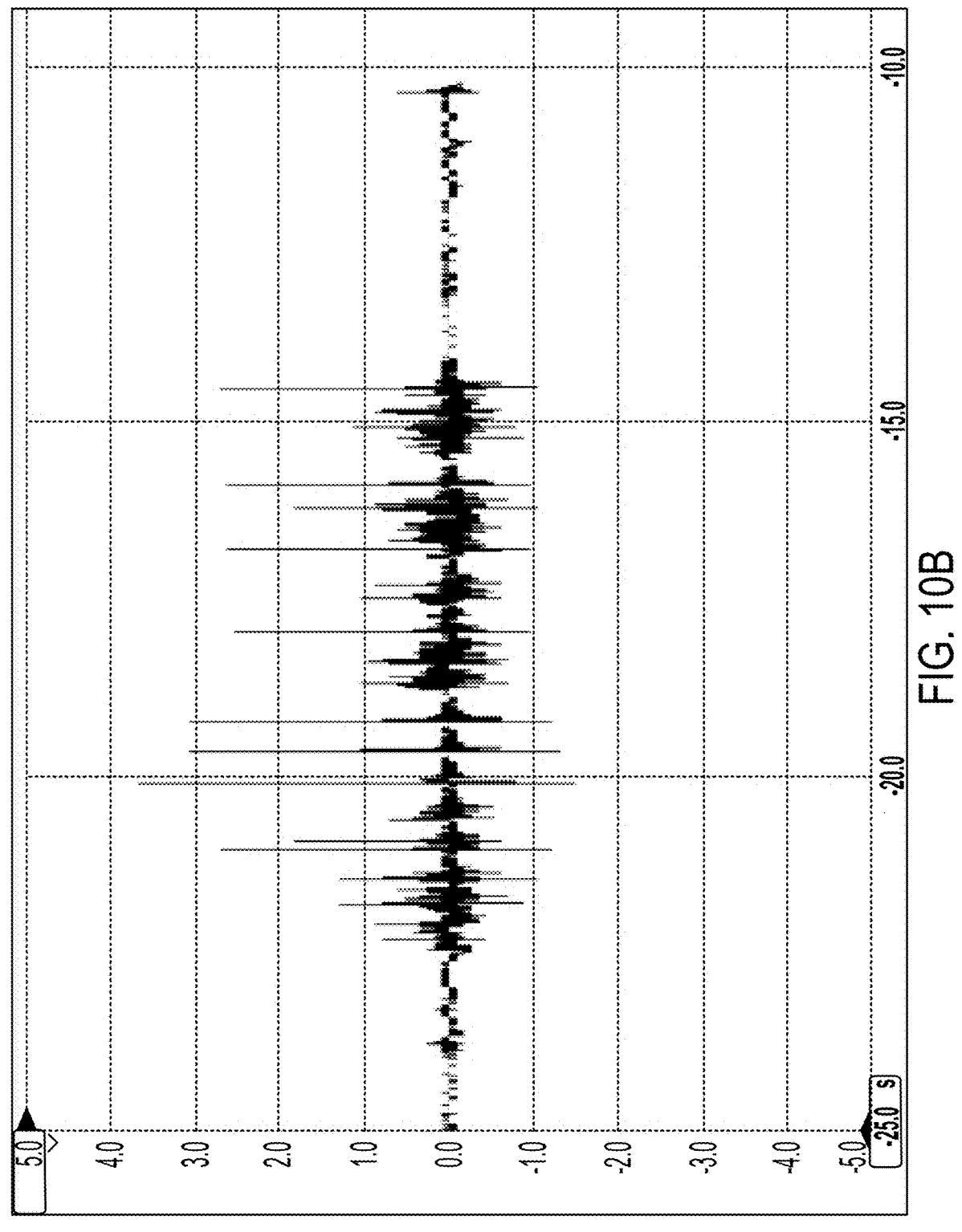

When a mechanical pressure is applied to piezoelectric materials, electric charges within the material become out of balance. This imbalance in charges creates an electrical potential that can be measured. Such electrical potential was measured by striking the piezoelectric disk with a hammer four consecutive times. As illustrated in FIG. 9, it was observed that there is a noticeable impulse signal that exceeds 20 volts. Another observation is that each impulse lasts around 25 milliseconds. FIG. 10 shows the voltage response of the piezoelectric material when a phone is rested on top. Unlike the hammer response shown in FIG. 9, the peak voltage produced is around 4 volts, and there is a residual impulse that decreases exponentially. It is important that the power transmitting device can filter such differences to determine whether an object is stationary or non-stationary on the wireless power transmitting device.

Figure 11:
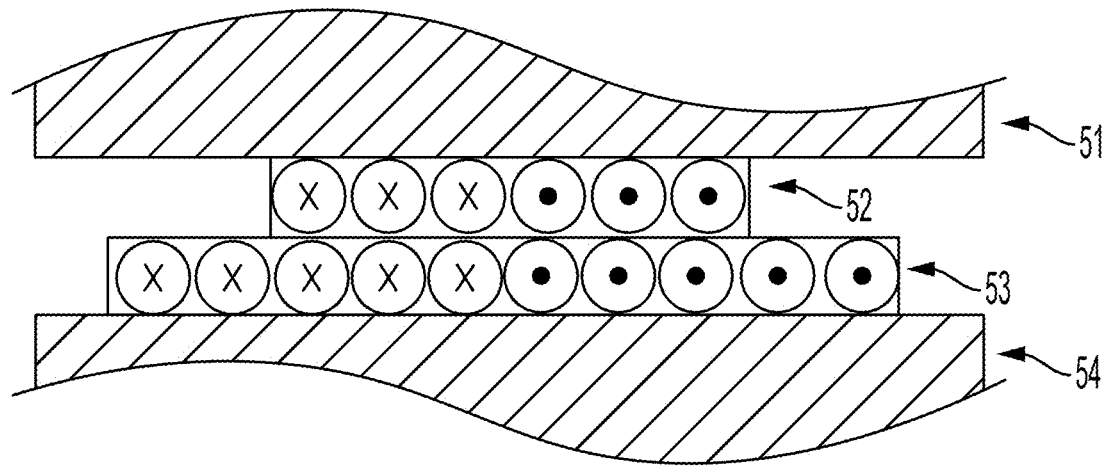
FIG. 11 depicts the layout of the transmitter coils of a wireless power transmitting device in accordance with an embodiment of the present invention.
Figure 12:
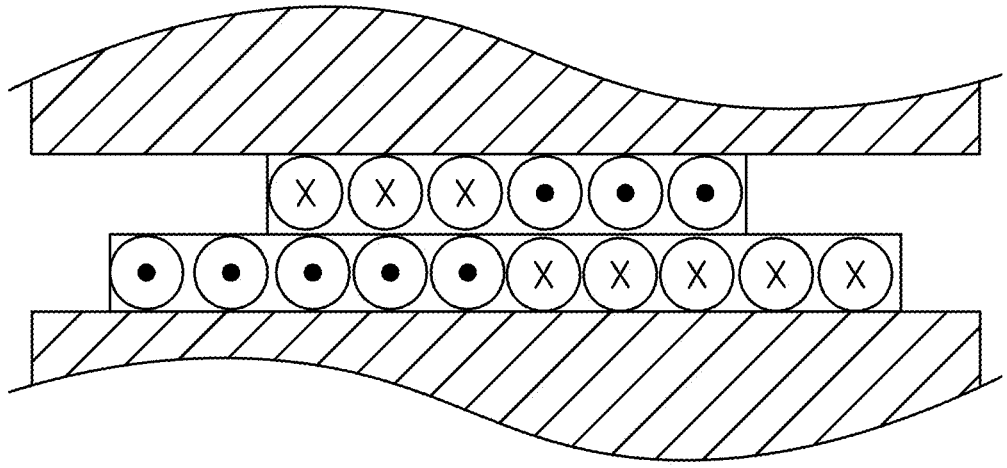
FIG. 12 depicts the layout of the transmitter coils of a wireless power transmitting device in accordance with another embodiment of the present invention.

FIG. 11 and FIG. 12 show examples of the layout of the transmitter coils of wireless power transmitting devices in accordance with embodiments of the present invention, in which transmitter coils 52, 53 of different sizes are provided between the cover and sensor layer 51 and the transmitter layer 54. Different power receiving devices need different power inputs. For example, a personal computer needs a significantly higher power input than a cell phone does. In order to satisfy the different power input requirements, the power transmitter coils of the power transmitting devices may be designed to have different magnetic fluxes by numbers of coil turns, different surface areas, different polarities, different orders of the coils, different coil sizes, and the like.

Figures 13A, 13B:
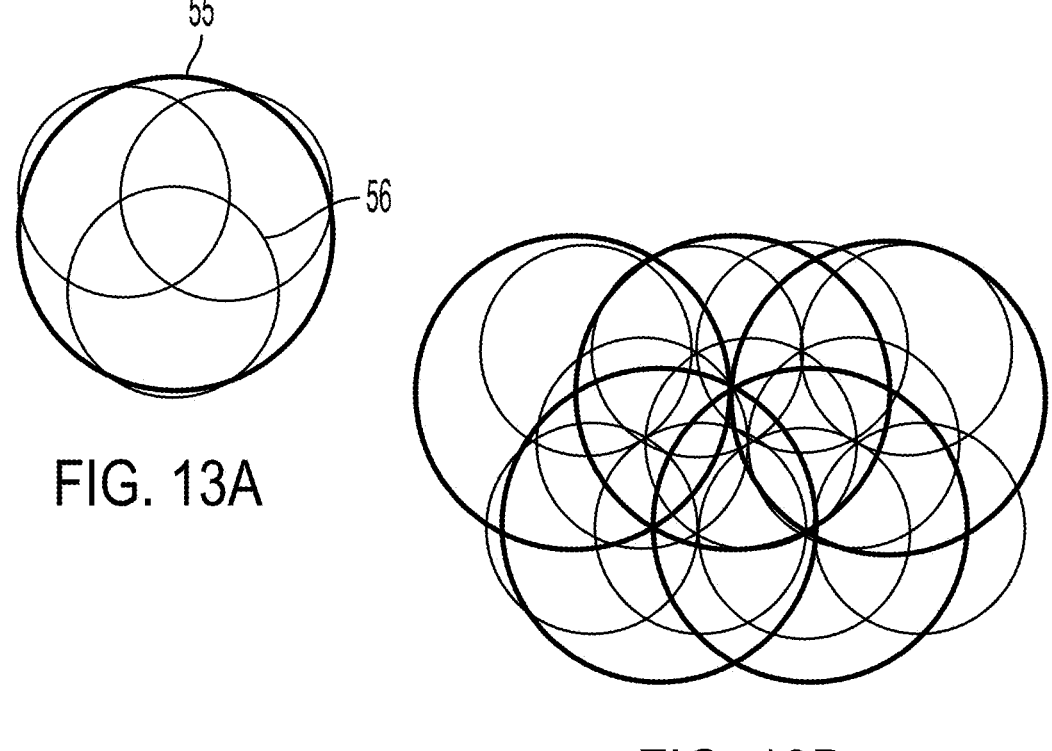
FIGS. 13A and 13B are top views of the transmitter coils of wireless power transmitting devices in accordance with embodiments of the present invention.

FIG. 13A and FIG. 13B are top views of the transmitter coils of wireless power transmitting devices in accordance with embodiments of the present invention. The larger coil 55 can be used to charge power receiving devices that require relatively higher input power such as personal computers and monitors. The smaller coils 56 can be used to charge power receiving devices that require relatively lower input power.

Figure 14:
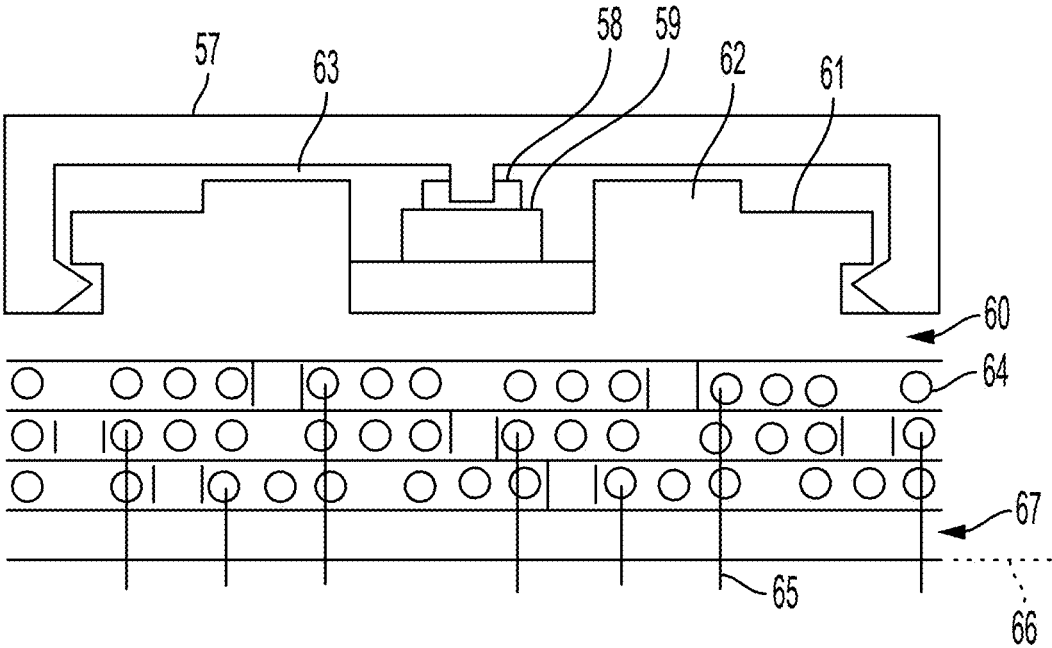
FIG. 14 is a diagram showing a wireless power transmitting device in accordance with an embodiment of the present invention, in which piezoelectric sensors and magnets are provided.

FIG. 14 is a cross-sectional view of a power transmitting device in accordance with an embodiment of the present invention. On the top of the power transmitting device are the tiles 57 made out of wood, plastic, glass, or any hard material that supports the design needs or requirements. In this embodiment, the tiles have a protruding tip that is held by a well 58. This protruding tip serves to conduct and focus the mechanical stress induced on the tiles 57 to the piezo material of the sensor 59. The tiles 57 are also locked into place by gripping 60 onto a support 61. The support may be made of hard rubber or other materials with enough flexibility and hardness to allow the tiles 57 and the sensor 59 to be securely attached. Furthermore, the support 61 has raised surface 62 to prevent the tiles 57 from over bending due to excessive mechanical stress. It is important to note that the raised surface 62 has enough displacement 63 to prevent damping of the mechanical stress induced onto the tiles 57. Transmitter coils 64 are underneath the optional support 61, and wires 65 connecting the transmitter coils 64 to a transmitter layer 66 penetrates a magnetic shield 67.

With the systems and devices in accordance with embodiments of the present invention, wireless charging can be made cost-effectively and conveniently. Compared with the conventional systems and devices, the systems and devices in accordance with embodiments of the present invention can charge power receiving devices with reduced power loss during idle times.

2. Methods

Figure 15:
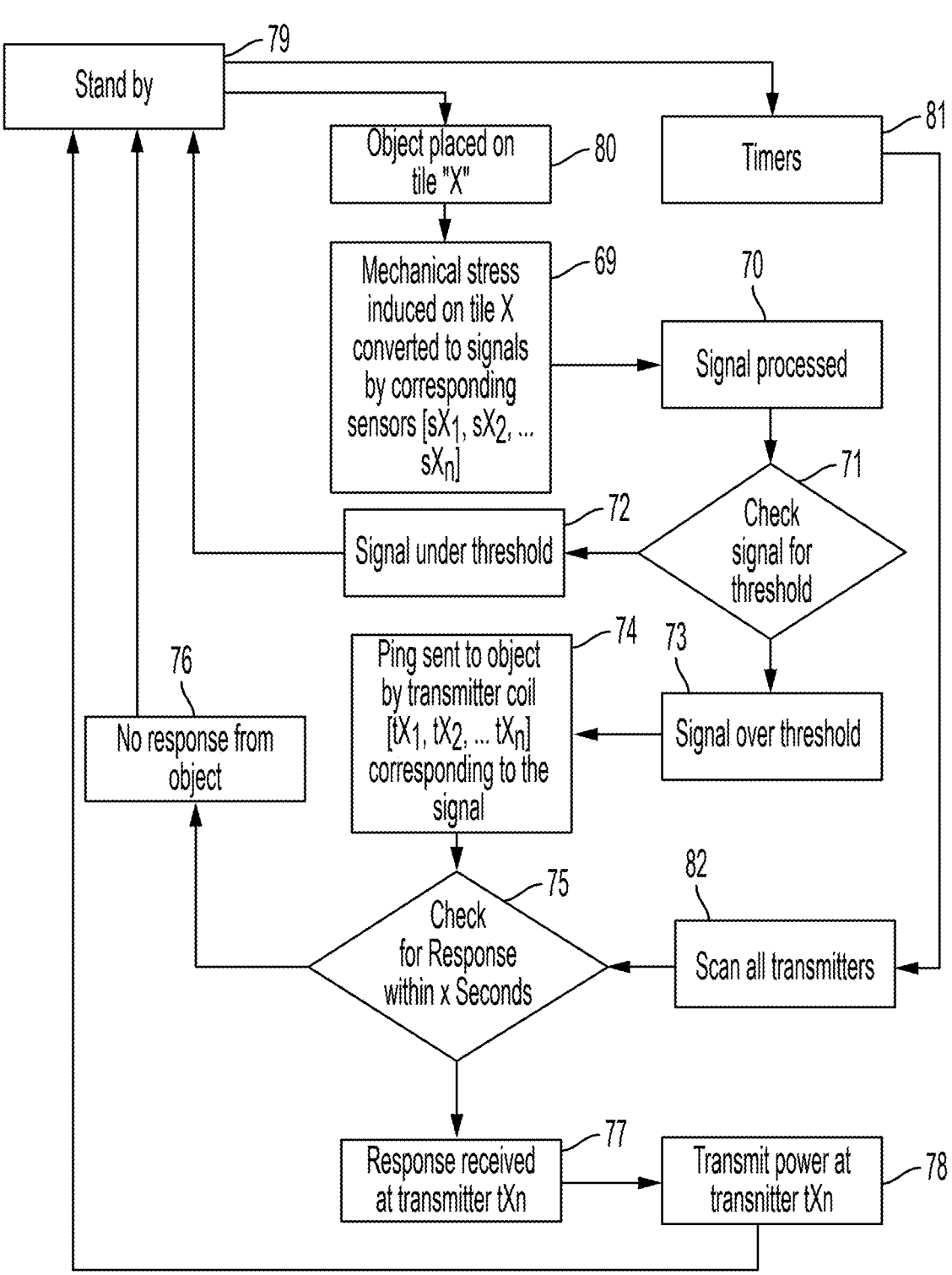
FIG. 15 is a flow-chart illustrating a method for wirelessly transmitting power in accordance with an embodiment of the present invention.

FIG. 15 is a flow-chart illustrating a method for wirelessly transmitting power in accordance with an embodiment of the present invention. When an object is placed on tile "X" of the cover layer of the power transmitting device of an embodiment of the present invention (S68), the sensors [sX1, sX2, . . . sXn] corresponding to tile "X" convert the mechanical stress into signals that can be processed by the power transmitting device (S69). These signals are then processed by the power transmitting device (S70) to filter mechanical stress not induced by the object (e.g., typing on keyboards, writing, mouse clicking, noise, etc.). It is determined whether the processed signal is under a set threshold or not (S71). If it is determined that the processed signal is under the set threshold, the power transmitting device will recognize the mechanical stress as a non-receiver and return to idle state (S72, S79) until the next detection of mechanical stress occurs. If it is determined that the processed signal is on or over the set threshold, the power transmitting device will recognize the mechanical stress as an "object" present on tile "X" and will begin the scanning protocol by sending ping to the object by the transmitter coils [tX1, tX2, . . . tXn] that correspond to the processed signal (S73, S74). It is determined whether the power transmitting device receives any response from the power receiving device (S75). If it is determined that the power transmitting device does not receive any response from the power receiving device, the power transmitting device will return to idle state until the next detection of mechanical stress occurs (S76, S79). If it is determined that the power transmitting device receives a response from the power receiving device through one of the transmitter coils for example, "tXn," the power transmitting device will begin to transmit power to the power receiving device through power transmitter coil "tXn" (S77, S78). After the initiation of power transfer between the power receiving device and power transmitting device, the power transmitting device will monitor power until the power transfer is complete or halted by the user. Once the power transfer is complete, the power transmitting device will return to idle state until the next detection of mechanical stress occurs (S79).

The inventor acknowledges that the methods can vary depending on the wireless charging standard. Regardless, a similar fashion of operation where scanning a local zone for a power receiving device using a mechanical sensor to conserve standby power consumption can be applied to any magnetic induction techniques.

The invention claimed is:

1. A system for wirelessly transmitting power, comprising:
    (a) a receiver; and
    (b) a power transmitting device for wirelessly transmitting power to the receiver, wherein the power transmitting device comprises:
        (i) a transmitter layer;
        (ii) a sensor layer provided on or over the transmitter layer and including one or more sensors; and
        (iii) a cover disposed on and supported by the one or more sensors, wherein the cover is sectionalized with a plurality of tiles,
    wherein, in response to the receiver being placed on the cover, the sensor layer detects on which tile or tiles among the plurality of tiles the receiver is placed based on a pressure due to the receiver, and subsequently, the transmitter layer within the corresponding tile or tiles transmits ping signals, thereby determining a location of the receiver within the corresponding tile or tiles.

2. The system of claim 1, wherein the transmitter layer comprises a transmitting device and a magnetic shield.

3. The system of claim 2, wherein the transmitter layer further comprises a microprocessor and/or microcontroller.

4. The system of claim 1, wherein the sensor layer comprises a piezoelectric sensor.

5. The system of claim 1, wherein the cover comprises one or more protrusions corresponding to the one or more sensors, and
    wherein each of the one or more protrusions is configured to press a corresponding sensor among the one or more sensors in response to an object being placed on the cover to transfer the pressure due to the object to the one or more sensors.

6. The system of claim 1, wherein a number of sensors included in the sensor layer is less than a number of transmitting devices included in the transmitter layer.

7. The system of claim 1, wherein the power transmitting device further comprises at least one support layer to support the power transmitting device.

8. A power transmitting device for wirelessly transmitting power to a power receiving device, the power transmitting device comprising:
    (i) a transmitter layer including a plurality of transmitting devices;
    (ii) a sensor layer provided on or over the transmitter layer and including one or more sensors; and
    (iii) a cover layer provided on or over the sensor layer,
    wherein a number of sensors included in the sensor layer is less than a number of transmitting devices included in the transmitter layer such that the sensors are configured to determine an approximate location of the power receiving device and the transmitting devices are configured to determine a more precise location of the power receiving device.

9. The device of claim 8, wherein the transmitter layer further comprises a magnetic shield.

10. The device of claim 9, wherein the transmitter layer further comprises a microprocessor and/or microcontroller.

11. The device of claim 8, wherein the sensor layer comprises a piezoelectric sensor.

12. The device of claim 8, wherein the cover layer is sectionalized with a plurality of tiles.

13. The device of claim 12, wherein the plurality of tiles are indexed.

14. The device of claim 8, further comprising a support layer to support the device.

15. A method for wirelessly charging one or more power receiving devices, the method comprising the steps of:

monitoring mechanical pressure applied to a cover of a power transmitting device and converting the mechanical pressure to an electrical signal or signals;

determining whether the mechanical pressure is due to one or more objects placed on the cover of the power transmitting device or due to transient noise, by analyzing the electrical signal or signals;

in response to determining that the mechanical pressure is due to one or more objects placed on the cover of the power transmitting device, scanning corresponding locations of the sensors by sending analog ping signals;

determining whether the power transmitting device receives a response or responses from the one or more objects in a pre-determined time period;

in response to the determination that the power transmitting device receives a response or responses from the one or more objects in the pre-determined time period, determining that the one or more objects comprise a power receiving device or devices; and transmitting power to the power receiving device or devices for wireless charging.

16. The method of claim 15, wherein said step of determining whether the mechanical pressure is due to one or more objects placed on the surface of the power transmitting device or due to transient noise comprises analyzing a residual impulse that decays over time.

17. The device of claim 12, wherein one sensor and a plurality of transmitting devices are provided in each of the plurality of tiles.

* * * * *